United States Patent [19]
Lockwood et al.

[11] Patent Number: 5,834,739
[45] Date of Patent: Nov. 10, 1998

[54] STIRRING HOT PLATE

[75] Inventors: Mark David Lockwood; Steven C. Peake, both of Dubuque, Iowa

[73] Assignee: Barnstead/Thermolyne Corporation, Dubuque, Iowa

[21] Appl. No.: 744,238

[22] Filed: Nov. 5, 1996

[51] Int. Cl.$^6$ .............................. H05B 3/68; F27D 11/00; B01F 15/06; B01F 13/08
[52] U.S. Cl. .......................... 219/458; 219/460; 219/433; 366/146; 366/273
[58] Field of Search .................................. 219/443, 457, 219/458, 460, 461, 463, 429, 430, 433; 366/142, 146, 249, 25, 273, 274; 422/68.1, 109, 199, 198

[56] References Cited

U.S. PATENT DOCUMENTS

| | | | |
|---|---|---|---|
| 1,644,255 | 10/1927 | Kercher et al. | 219/461 |
| 1,662,805 | 3/1928 | Frank | 219/460 |
| 2,169,864 | 8/1939 | Prade . | |
| 2,238,402 | 4/1941 | Smith | 219/460 |
| 2,518,758 | 8/1950 | Cook . | |
| 2,715,173 | 8/1955 | Farquharson | 219/460 |
| 2,829,528 | 4/1958 | Hulick, Jr. . | |
| 2,837,320 | 6/1958 | Baron . | |
| 3,028,476 | 4/1962 | Hug . | |
| 3,052,791 | 9/1962 | Jacobs et al. . | |
| 3,138,370 | 6/1964 | Anderson et al. | 366/142 |
| 3,211,433 | 10/1965 | Chrostowski et al. | 366/142 |
| 3,433,465 | 3/1969 | Szpur . | |
| 3,627,986 | 12/1971 | Anderson | 219/460 |
| 3,766,360 | 10/1973 | Eddleman et al. . | |
| 3,870,862 | 3/1975 | Doner | 219/461 |
| 3,936,660 | 2/1976 | Blackwood . | |
| 4,216,370 | 8/1980 | Charvat | 219/460 |
| 4,568,192 | 2/1986 | Kudermann et al. . | |
| 5,533,800 | 7/1996 | Stiegelmann et al. | 366/142 |

*Primary Examiner*—Teresa J. Walberg
*Assistant Examiner*—Sam Paik
*Attorney, Agent, or Firm*—Wood, Herron & Evans, L.L.P.

[57] ABSTRACT

A stirring hot plate (20) having an electrical heating element (30) embedded in a generally horizontal plate (26) for supporting a vessel containing a substance to be selectively heated and stirred. The stirring hot plate (20) has a high temperature enclosure (84) mounted to the bottom of the plate (26) that receives the ends (32, 33) of the electrical heating element (30). A stirring device drive (64) and control (68) are mounted in a low temperature enclosure (86). A tubular conduit (96) has one end (107) connected to the low temperature enclosure (86), and an opposite end (98) connected to the high temperature enclosures (84). The tubular conduit (96) has an internal passage (97) for receiving and carrying wires (76, 80, 83) between the high and the low temperature enclosures (84, 86). The tubular conduit (96) is made of a material having a low thermal conductivity to maintain the one end (107) of the conduit (96) at a temperature substantially lower than the opposite end (98) having a temperature approximately equal to the temperature of the plate (26).

43 Claims, 3 Drawing Sheets

STIRRING HOT PLATE

FIELD OF THE INVENTION

This invention relates to hot plates and more particularly, to a stirring hot plate designed for use in hazardous environments.

BACKGROUND OF THE INVENTION

Heating devices are widely used in a variety of industrial and laboratory settings for heating substances contained in vessels. For instance, hot plates are commonly used for heating chemicals and other materials in open or closed vessels, in order to promote a chemical reaction or change in properties of the materials. A typical hot plate includes a spiral or coil-type heating element disposed below or embedded within a horizontal support surface for the vessel to be heated. A housing or base unit is usually provided for containing the electrical leads and connections between the heating element and an electrical supply line, as well as other components such as switches, over-temperature shut-off devices, potentiometer controls, and the like.

In certain industrial, laboratory, or research applications, it is necessary to cook or boil off substances which give off flammable and/or volatile, potentially explosive gases, for example, petroleum products, paint products, etc. In such circumstances, exposure of these gases to any source of ignition must be prevented. This consideration led to the development of a hot plate Model No. HP-11515B by the assignee of the present application which plate meets certain widely recognized and adopted industry standards entitling the hot plate to be certified as "explosion proof" by the Hazardous Locations Division of the Underwriters Laboratory. Specifically, the hot plate meets the standards required of "explosion proof" electric heaters for use in Class I, Group D hazardous atmospheres, as established by the Underwriters Laboratory. More particularly, with regard to the present invention, the certification of a hot plate as "explosion proof" means that the hot plate meets the Underwriters Laboratory standard UL 823, the most recent version of which was published Feb. 22, 1991. Under that specification, volatile gasses are free to circulate throughout the device; however, any source of ignition, for example, an electric arc, must be contained within an enclosure. Further, any junctions interconnecting components of the enclosure or connecting the enclosure with external parts must meet the UL 823 specifications for flame paths. If a volatile gas does ignite within the enclosure, those specifications for the flame paths are designed to cool and extinguish the flame before it reaches the environment outside the enclosure.

In many industrial and laboratory processes, there is frequently a need for a substance in a container or vessel to experience motion or circulation simultaneously with it being heated. Thus, various types of stirring hot plates have been developed. One known type of stirring hot plate employs a magnetic stirring device which has a driving magnet mounted on the motor shaft directly below the support surface of the hot plate. The driving magnet produces a magnetic field that couples with a magnetic stirring bar placed in the substance being heated, thereby causing the stirring bar to rotate in synchronism with the permanent magnet. By changing the speed and direction of rotation of the rotating drive magnet, the magnetically coupled stirring bar is effective to impart different types of stirring actions to the substance.

Stirring hot plates often have electronic motor control systems for varying the speed and direction of rotation of the stirring device. The stirring motor and the electronic motor speed and hot plate temperature controls are generally contained within a base unit supporting the hot plate. The motor and electronic controls are normally thermally sensitive components, and their expected life and/or performance can be harmed by high temperatures. Therefore, heat shields and/or cooling fans are frequently contained within the base unit for reducing the heat transfer from the heating element to these thermally sensitive components. For instance, U.S. Pat. No. 2,829,528 describes a gyratory hot plate in which the heating element and the motor are separated by a layer of rock wool, a pair of asbestos sheets reinforced with a corrugated metal sheet, and a metal heat-reflecting shield. In another example, U.S. Pat. No. 3,028,476 describes a hot plate and magnetic stirrer in which a base unit contains the motor and permanent magnet within a closed housing, and the hot plate is a separate unit which sits atop the base unit. The hot plate unit has a stainless steel radiation shield on its underside, which is shaped to permit air circulation between the hot plate and the shield and thermally isolate the hot plate from the base unit.

Conventional stirring hot plates, however, are not suitable for processing substances which give off flammable or explosive gases, because they do not have provisions for preventing the ignition of the gases by electrical arcs or sparks from escaping into the environment. Therefore, when users desire to operate a stirring hot plate in hazardous atmospheres involving explosive gases, they simply leave the room. Thus, the use of conventional stirring hot plates with such substances may present a safety problem, as well as be relatively inconvenient to use.

Consequently, there is a need for a stirring hot plate in which the risk of fire or explosion is greatly reduced or eliminated, so that an operator can safely remain in attendance during the heating and stirring of the substance being processed. Preferably, such a stirring hot plate will permit the speed of the stirring motor and temperature of the heating element to be varied.

Preferably, such a stirring hot plate should meet the established Underwriters Laboratory standards for "explosion proof" electric heating devices for use in Class I, Group C atmospheres. Meeting these standards with a non-stirring hot plate was more readily achievable because all of its electric components and controls are able to tolerate the high temperatures found in the base unit, that is, up to about 220° Celsius and can be contained in a single "explosion proof" enclosure.

However, in the case of a stirring hot plate, the problem is complicated by the requirement of having to maintain the thermally sensitive electronic controls and the stirring motor at an acceptably low temperature, for example, 70° C. Further, convenience of use and marketing considerations dictate that the hot plate be as small as possible. Thus, the development of a stirring hot plate that meets established standards for "explosion proof" electric heating devices presents a number of difficulties which have not heretofore been surmounted.

SUMMARY OF THE INVENTION

The stirring hot plate of the present invention is especially valuable for heating and stirring substances which normally give off volatile and explosive gases during the heating and stirring process.

According to the principles of the present invention and in accordance with the preferred embodiments, the stirring hot plate includes an electrical heating element associated with a generally horizontal plate adapted to support a vessel containing a substance to be selectively heated and stirred. The stirring hot plate further includes a high temperature enclosure mounted to the bottom of the plate that receives the ends of the electrical heating element. A stirring device provides a rotating magnetic field above the plate, and the stirring device includes a stirring device drive and control mounted in a low temperature enclosure. A tubular conduit is connected to both of the high temperature and the low temperature enclosures. The tubular conduit has an internal passage for receiving and carrying wires between the high and the low temperature enclosures. The tubular conduit is made of a material having a low thermal conductivity so that one end of the conduit does not exceed a desired temperature for the low temperature chamber in response to the other end of the conduit having a temperature approximately equal to the temperature of the plate.

In one aspect of the invention, the high temperature enclosure contains the electrical connections to the heating element, a temperature sensor and an over-temperature switch and may reach temperatures of up to approximately 220° C. Further, the low temperature enclosure contains a temperature sensitive stirring motor and electronic controls for controlling the motor speed and the temperature of the heating element and therefore, should preferably have a substantially lower temperature, for example, a temperature in the range of from approximately 70° C. to approximately 125° C.

In a further aspect of the invention, the high and low temperature chambers are designed and manufactured to comply with the relevant portions of the Underwriters Laboratory specifications for "explosion proof" hot plates and motors, respectively. Therefore, the stirring hot plate 20 has the advantage it may be fully attended during the heating and stirring fluids which normally give off volatile and explosive gases during the heating and stirring process.

These and other objects and advantages of the present invention will become more readily apparent during the following detailed description taken in conjunction with the drawings herein.

DETAILED DESCRIPTION OF THE INVENTION

Figure 1:
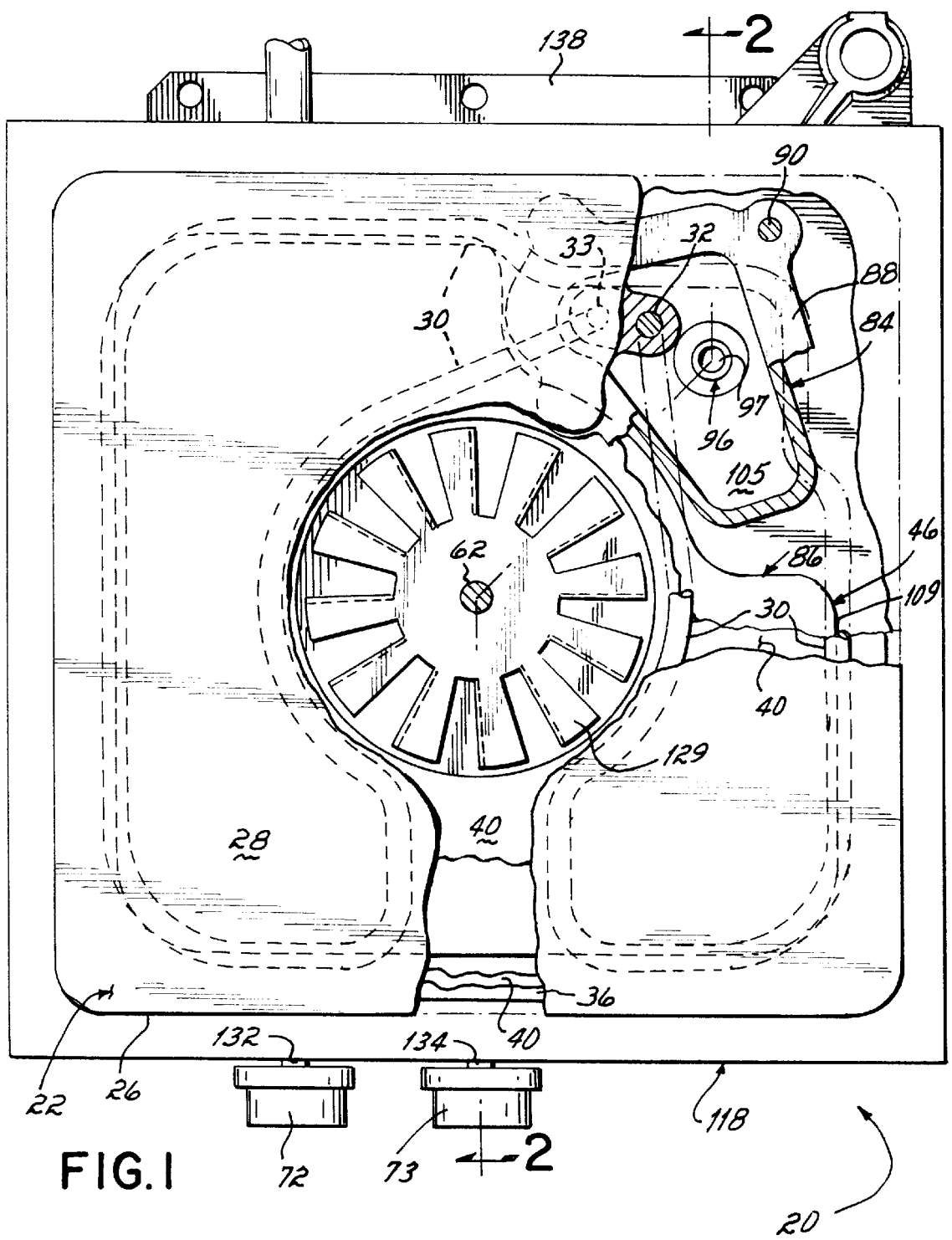
FIG. 1 is a top plan view of a stirring hot plate in accordance with the principles of the present invention.
Figure 2:
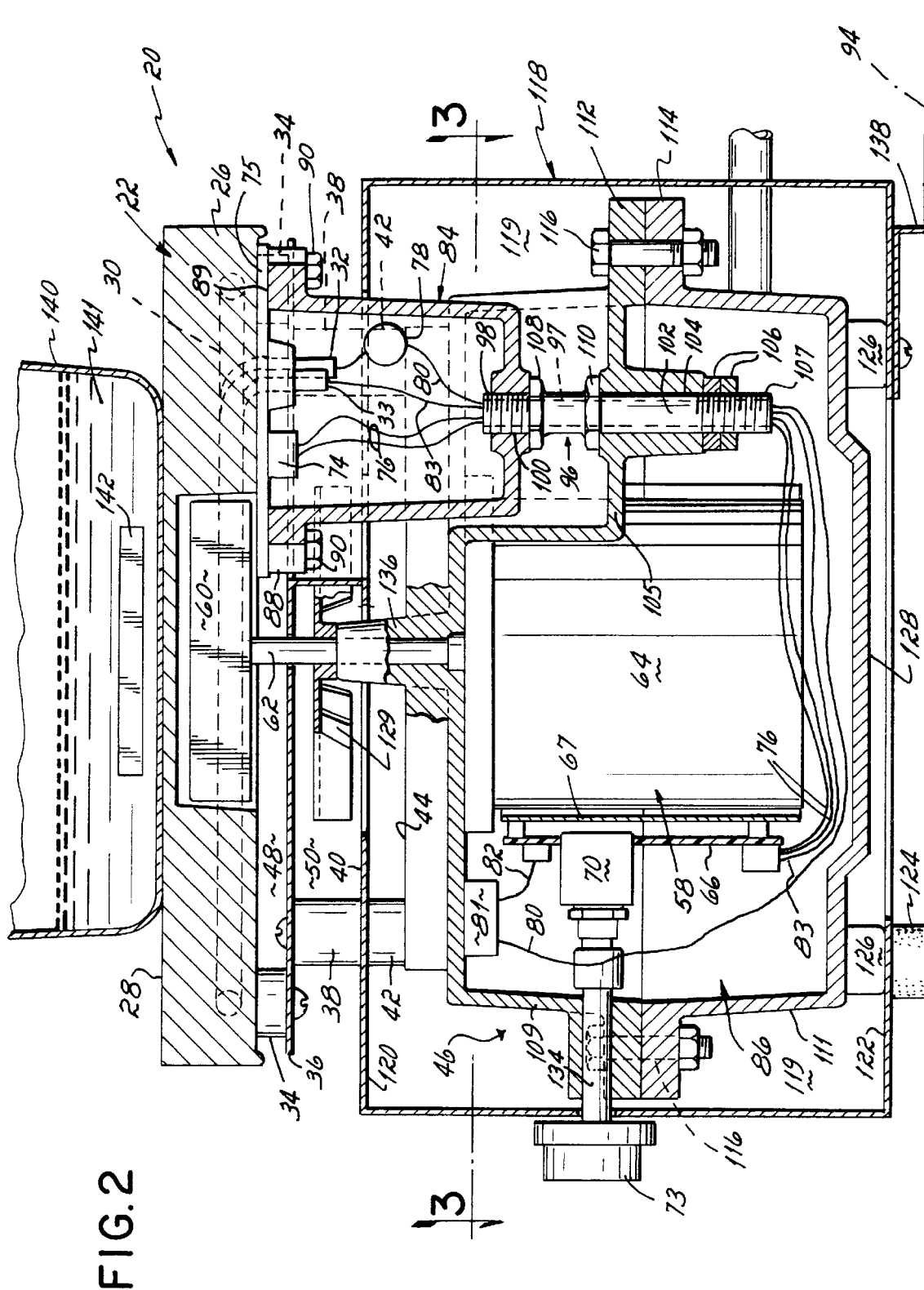
FIG. 2 is a cross-section view taken along the line 2—2 of FIG. 1.

Referring to FIGS. 1 and 2, a stirring hot plate 20 includes a hot plate unit 22 having a heat conducting plate 26 with a horizontal upper surface 28. The plate 26 is preferably an aluminum casting. The hot plate unit 22 further includes a heating element 30 which, preferably, is embedded within the plate 26, for example, by being cast in the plate 26. The heating element 30 is preferably a "CALROD" resistance-type element with a maximum power consumption of approximately 1,000 watts. The heating element has terminal ends 32, 33, which protrude downward out of the plate 26 for electrical connection with other components.

The hot plate unit 22 is supported at three corners (FIG. 1) by spacers 34 located between the plate 26 and an upper heat shield 36 at three corners. The assembly of the hot plate unit 22 and the upper heat shield 36 is supported at the three corners by spacers 38 (FIG. 2) located on top of a lower heat shield 40. The assembly of the hot plate unit 22 and the heat shields 36, 40 is supported at the three corners by spacers 42 located on an upper surface 44 of a base unit 46. The spacers 34, 38, 42 are preferably made of a refractory material, for example, a ceramic or another material that is a poor thermal conductor. The heat shields 36, 40 are preferably made of a material that is a poor thermal conductor, for example, stainless steel. The open structure of the heat shields provides ventilation spaces 48, 50 to help dissipate the heat from the hot plate unit 22 and the base unit 46.

Figure 3:
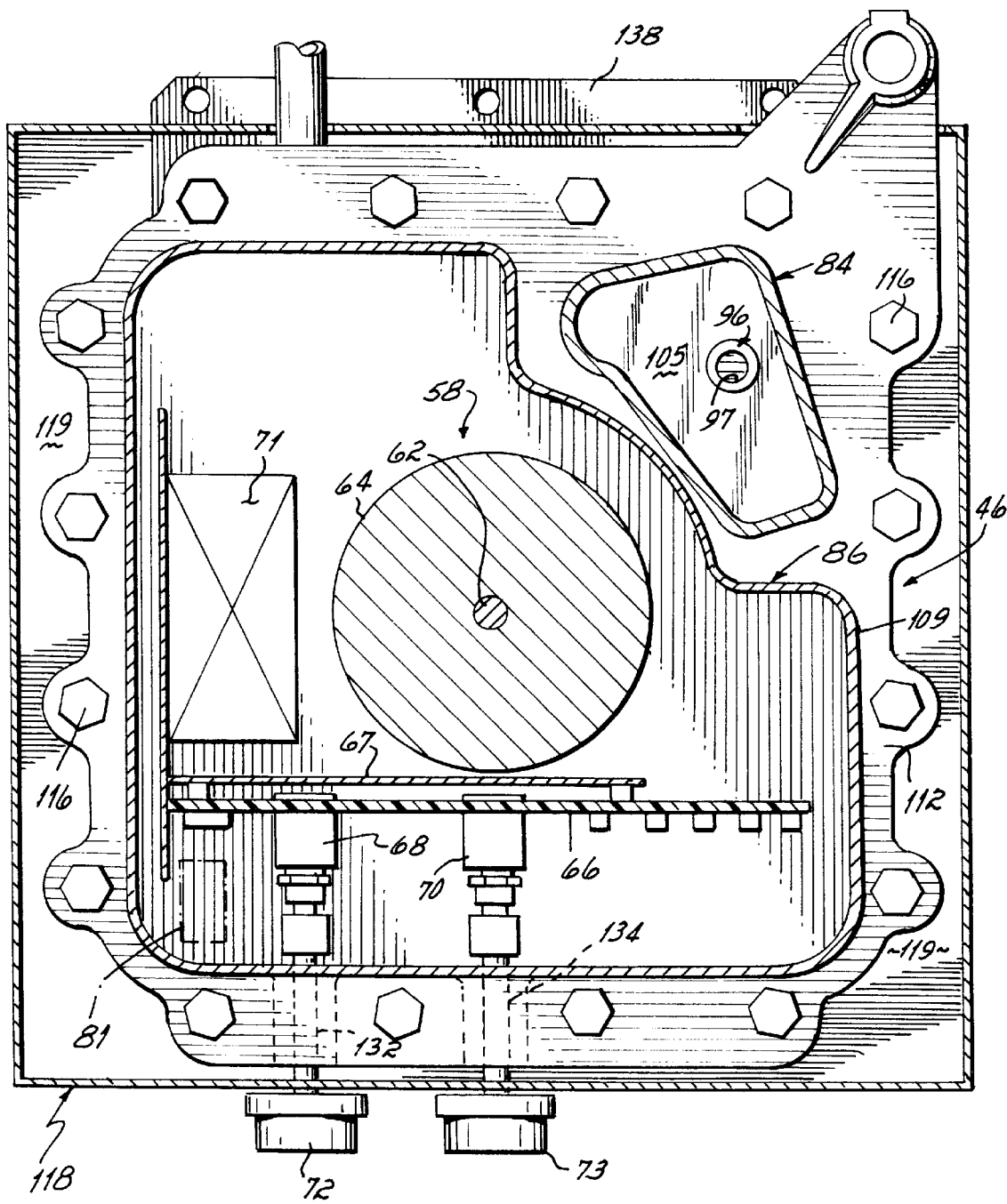
FIG. 3 is a cross-section view taken along the line 3—3 of FIG. 2.

The base unit 46 contains a magnetic stirring device 58 which produces a rotating magnetic field above the upper surface 28 of the plate 26. The stirring device 58 includes a stirring device drive, for example, a motor 64 having a rotating output shaft 62, and the stirring device 58 further includes a permanent drive magnet 60 mounted on the output shaft 62 within the plate 26 immediately below the upper surface 28. The rotating drive magnet 60 is effective to provide the desired rotating magnetic field above the surface 28. Referring to FIG. 3, a printed circuit ("PC") board 66 mounted on a bracket 67 contains electronic controls for both a motor speed control 68 and a temperature control 70. A transformer 71 is electrically connected to the PC board 66 for supplying different power supply voltages thereto. Any desired motor speed in a range of from approximately 55 revolutions per minute (rpm) to approximately 1250 rpm may be selected with the motor speed knob 72, and the speed control 68 maintains the desired speed. Similarly, any desired temperature in the range of approximately 38° C. to approximately 220° C. may be selected with the temperature control knob 73, and the temperature control 70 maintains the temperature of the hot plate unit 22 at the selected desired temperature.

Referring to FIG. 2, the temperature control 70 includes a thermocouple 74 mounted directly to a boss 75 extending downward from the lower surface of the heat conducting plate 26. The thermocouple 74 is electrically connected to the temperature control 70 on the PC board 66 by wires 76. The heating element 30 is connected in series with a bimetallic over-temperature switch 78. The lead 32 from the heating element 30 is connected to one side of normally closed contacts (not shown) in the switch 78; and the other side of those contacts is connected by wire 80 to a relay 81 also mounted in the base unit 46 and connected to the PC board 66 via wires 82. The other lead 33 of the heating coil 30 is connected by a wire 83 to the PC board 66.

In order for the stirring hot plate 20 to be certified as "explosion proof", all sources of electrical sparks or ignition must be enclosed in a housing that meets the relevant portions of the Underwriters Laboratory UL-823 and UL-674 specifications for hot plates and motors, respectively.

Further, the surfaces of the conductive plate 26 operate at temperatures of up to 220° C., whereas the ambient temperature around the motor 64 and control components on the PC board 66 should preferably be at a substantially lower temperature. However, depending on the electronic components selected, that lower temperature may be allowed to range from approximately 70° C. to approximately 125° C. Further, the wires 76, 80, 83 must extend between the high temperature thermocouple 74 and overtemperature switch 78 and the PC board 66. Therefore, there are two heat control problems. First, the temperature sensitive motor 64 and control components on PC board 66 must be thermally isolated from the very high temperatures associated with the plate 26 and thermocouple 74. Second, the motor 64 and control components on PC board 66 also create heat during their operation. Further, those components must be located in an unvented fully enclosed chamber. Therefore, other heat dissipating and/or thermally isolating means are preferably provided to dissipate the heat created by those components.

The stirring hot plate 20 of the present invention addresses the first temperature isolation problem by providing a high temperature enclosure or chamber 84 and a low temperature enclosure or chamber 86. The high temperature enclosure 84 surrounds the ends 32, 33 of the heating element 30, the thermocouple 74 and the over-temperature switch 78. The high temperature enclosure 84 is preferably a generally cylindrical, cup-shaped aluminum casting having a mounting flange 88 extending laterally around the whole perimeter of its upper, open end. The high temperature enclosure 84 is preferably mounted to the boss 75 with cap screws 90 or other fasteners extending through the flange 88 and threaded into the boss 75. Preferably, the boss 75 is shaped to correspond to the shape of the perimeter of the flange 88.

Even though the high temperature chamber 84 can be physically isolated from the low temperature chamber 86, it is still required that the chambers be interconnected to pass the wires 76, 80, 83 there between. That interconnection has several requirements. First, it must have the physical strength to contain any explosion of gases within either of the chambers 84, 86. Second, it must minimize the transfer of heat from the high temperature enclosure 84 to the low temperature enclosure 86. Third, it determines the elevation of a fourth corner of the heat conducting plate 26 not supported by spacers 34 (FIG. 1). As previously described, the plate 26 is supported at three corners by spacers 34, 38, 42 resting on an upper surface 44 of the lower temperature chamber 86. The elevation of the fourth corner of the plate 26 is determined by the interconnection of the high temperature chamber 84 with respect to the low temperature chamber 86. Fourth, the interconnecting element between the high and low temperature chambers 84, 86 must comply with the UL-823 to permit the stirring hot plate 20 to be certified as "explosion proof".

A tubular conduit 96 is used to interconnect the chambers 84, 86; and the conduit 96 has an internal passage 97 for receiving and carrying the wires 76, 80, 83 between the enclosures 84, 86. The conduit 96 is preferably made of a rigid strong material that is a poor conductor of heat, for example, a 303 stainless steel 0.625 inch hex rod. The upper end 98 of the conduit 96 is threaded into a through-hole 100 located centrally in the closed end of the high temperature chamber 84. Preferably, the through-hole 100 is concentric with the longitudinal axis of the cylindrical cup-shaped high temperature enclosure 84. The conduit 96 further has a smooth shaft portion 102 extending through a bore 104 in a wall 105 of the low temperature chamber 86. The conduit 96 is secured to the low temperature chamber, preferably by double nuts 106 fastened to a threaded end 107. The conduit 96 preferably has upper and lower shoulders 108, 110, respectively. The distance between an upper surface of the shoulder 108 and a lower surface of the shoulder 110 is accurately determined so that the high temperature chamber 84 is located with respect to the low temperature chamber 86 such that the upper surface 28 of the plate 26 is located substantially parallel to a supporting surface 94 on which the stirring hot plate 20 is located.

The low temperature enclosure 86 is preferably constructed of an upper shell or casting 109 and a lower shell or casting 111. The upper casting 109 is preferably generally square shaped with a closed upper end and a flange 112 extending laterally from and circumferentially around the edge of its downward facing open end. The lower casting 111 is also generally square shaped with a closed lower end and a flange 114 extending laterally from and circumferentially around the edge of its upper facing open end. Bolts 116 extending through the flanges 112, 114 are effective to secure the castings 109, 111 as the unitary low temperature enclosure 86.

While the stainless steel conduit 96 effectively thermally isolates the high temperature chamber 84 from the low temperature chamber 86, the low temperature chamber 86 should also be cooled to dissipate heat generated by the electrical components therein. A sheet metal housing 118 generally surrounds the low temperature chamber 86 to form a duct or plenum 119 between the outside of the low temperature enclosure 86 and the inside of the housing 118 and a lower side of the lower heat shield 40. The housing 118 has a partial top wall 120 attached to the outer peripheral edge of the lower heat shield 40. The housing 118 further has a partial bottom wall 122 connected to the enclosure 86 by fasteners (not shown) extending through rubber feet 124 and into a boss 126. The central portion of the lower wall 122 of the housing 118 is open, thereby exposing the lower side 128 of the low temperature housing 86 to ambient air. A fan 129 mounted on the output shaft 62 of the motor 64 is effective to draw ambient ventilating air through the lower wall 122 of the housing 118 and through the duct 119 around the outer surfaces of the low temperature housing 86. That ventilating air exits through a centrally located circular opening in the upper wall 120 of the housing 118 that is directly below the fan 129.

In the preferred embodiment, all connections between the enclosures 84, 86 and other components are designed to meet the UL-823 specifications so that the stirring hot plate 20 can be certified as "explosion proof". For example, to contain an explosion within the high temperature chamber 84, the flame path 89 between the lower surface of the boss 75 and the upper surface of the flange 88 must meet certain specifications. For example, those mating surfaces must provide an uninterrupted generally radial flame path of at least 0.375 inches from the interior of the chamber 84. Further, those surfaces must meet together so that the maximum clearance between them is no more than 0.0015 inches. Therefore, any flame within the high temperature chamber 84 penetrating the junction between the boss 75 and the flange 88 will move across the flame path 89 there between. Both the boss 75 and the flange 88 are made of a thermally conductive material, for example, aluminum. Therefore, before the flame reaches the end of the flame path, 89 heat has been dissipated therefrom, and the flame is extinguished. Therefore, any potential explosion or flame within the high temperature chamber 84 cannot escape therefrom. Similar specifications relating to mating surfaces apply to the mating surfaces between the flanges 112, 114.

Other specifications apply to shafts penetrating the walls of the enclosures. For example, for the non-rotating shaft 102 and the control knob shafts 132, 134 (FIG. 3), the UL-823 specifications require a flame path between the shaft and its mating bore have a length of at least 1.0 inch and the diametric clearance between the shaft and its mating bore be less than 0.0033 inches. Similarly, the UL-674 specification applies to the rotating motor shaft 62 extending through the upper wall 120, however, the permitted diametric clearance for the rotating shaft is slightly larger. Therefore, to accommodate the above specifications, the low temperature enclosure 86 is manufactured with the bosses 136 having respective internal bores to provide the desired flame path length.

In use, the stirring hot plate 20 is placed on a bench top or other supporting surface 94, and if desired, the stirring hot plate may be secured to the surface 94 by fasteners (not shown) that extend through a bracket 138 (FIG. 1). A vessel 140 containing a fluid 141 to be stirred is placed on support surface 28. If necessary, a ring stand holder (not shown) of known design may be secured on the vessel to prevent its tipping. A magnetic stirring bar 142 is then placed inside the vessel. The speed control knob 72 is then rotated from its off position to select a desired speed for the stirring bar 142. As the drive magnet 60 on the output shaft 62 of the motor 64 rotates, it creates a rotating magnetic field above the upper surface 28 of the plate 26. The stirring bar 142 in the fluid 141 follows the rotation of the magnetic field produced by the drive magnet 60, thereby stirring the fluid 141. The speed control 68 is effective to maintain the selected, desired speed. Similarly, the temperature control knob 73 may be rotated from its off position to select a desired temperature for the hot plate. The temperature control 70 operating with the thermocouple 74 is effective to maintain the selected, desired temperature. Further, if the temperature exceeds the maximum allowable temperature, the contacts within the over-temperature switch 78 will open disconnecting power from the heating element 30.

If the fluid being stirred is a flammable, volatile fluid, molecules of that fluid will enter the atmosphere and infiltrate the ambient air around the stirring hot plate 20. It is further possible that such molecules will enter either one of the chambers 84, 86. In the event of an electric arc or spark from the devices in either of the chambers, an explosion in those chambers may occur. However, by design of the flame paths, any flame from such explosion is dissipated and extinguished before it reaches the environment outside the chambers. Therefore, the stirring hot plate 20 has the advantage it may be fully attended during the heating and stirring of flammable and volatile fluids.

While the present invention has been illustrated by the description of an alternative embodiment, and while the embodiments have been described in considerable detail, it is not the intention to restrict or in any way limit the scope of the appended claims to such detail. Additional advantages and modifications will readily appear to those skilled in the art. For example, other stirring devices may be used to provide the desired stirring action. In a alternative magnetic stirring device, the drive utilizes coils instead of the motor 64 to produce a rotating magnetic field that rotates in turn the stirring bar 142. Therefore, with such a device, the motor 64 and the stirring drive magnet 60 are replaced by the coils and electronic controls therefor. Alternatively, a nonmagnetic stirring device that is directly coupled to a stirring element in the vessel may be used.

Further, the speed control knob 72 of the present invention can be replaced by a wired or wireless remote control. In addition, the speed control can also be designed to permit the user to control the direction of rotation of the stirring bar 142 and also permit the user to program stirring cycles. The shape of the high temperature enclosure 84 is generally cylindrical, and the shape of the low temperature enclosure 86 is generally square. Both enclosures 84, 86 are preferably made of aluminum. As will be appreciated, the enclosures 84, 86 may be of any shape and can be made of other heat conducting materials. Dissipation of heat from the walls of the low temperature enclosure 86 is more important than with the high temperature enclosure 84.

As described, the conduit 96 is secured to the low temperature enclosure 86 by nuts 106 at the lower end of a smooth shaft 102. That construction is to facilitate the assembly of the stirring hot plate 20. In an alternative construction, the lower end of the conduit 96 may be threaded into the wall 105 of the enclosure 86; and in a still further alternative, the shaft 102 may be located on the upper end of the conduit 96. The conduit 96 is preferably described as a rigid conduit, however, a flexible conduit may also be used and can interconnect with the chambers 84, 86 at different locations than that described. In addition, while the conduit is preferably threaded into the chamber 84 and extends through a bore into chamber 86, the conduit 96 could also be connected to the chambers via a flange connection. Such flange connection should preferably meet the flame path requirements of the UL specifications for such connections, for example, as shown with respect to flanges 88, 112 and 114. Therefore, it is required that the ends of the conduit 96 be attached to, mounted to or otherwise connected to the chambers 84, 86 with fasteners, couplings, or otherwise. As will further be appreciated, the UL specifications for the length of a flame path is dependent on several criteria and will vary therewith. For example, as the diametric tolerance or thread tolerances dimensionally decrease, thereby providing a smaller diametric flame path, the UL specifications will permit the length of the flame path to be correspondingly decreased. Further, as described herein, the dimensional tolerances have been chosen to meet the UL standards for "explosion proof" electric heating devices for use in Class I, Group C atmospheres; however, dimensional tolerances may be selected to meet the UL standards for "explosion proof" electric heating devices for use in Class I, Groups A, B or D atmospheres or other standards for other atmospheres.

As will be appreciated, the powered ventilation using the fan 129 can be eliminated; however, in such case, depending on the electronic components used, there may be some degradation in the useful life of the stirring hot plate 20. Further, while the heating element is preferably described as a 1000 watt heater, heating elements of different wattage may be used. The invention in its broadest aspects is therefore not limited to the specific details, representative image system and illustrative examples shown and described. Accordingly, departures may be made from such details without departing from the spirit or scope of applicant's general inventive concept.

What is claimed is:

1. A stirring hot plate comprising:
   a plate having a generally horizontal upper surface for supporting a vessel containing a substance to be heated and stirred;
   an electrical heating element in a heat transfer relation to the vessel supported on the plate, the heating element electrically connected to heat the substance in the vessel supported on the plate;
   a high temperature enclosure disposed on a lower surface of the plate for receiving an end of the electrical heating element, the high temperature enclosure having a temperature approximately equal to the temperature of the plate when the heating element is electrically energized;
   a low temperature enclosure having a desired temperature lower than the plate;
   a stirring device for stirring the substance in the vessel, the stirring device including a stirring device control mounted in the low temperature enclosure; and
   a tubular conduit having
      one end connected to the low temperature enclosure, and an opposite end connected to the high temperature chamber, the tubular conduit being made of a material having a low thermal conductivity such that the one end of the conduit does not exceed the desired temperature in response to the opposite end of the conduit being approximately equal to the temperature of the plate.

2. The stirring hot plate of claim 1 wherein the tubular conduit is made of a rigid material.

3. The stirring hot plate of claim 2 wherein the tubular conduit is made of stainless steel.

4. The stirring hot plate of claim 3 wherein the tubular conduit is rigidly connected to the high temperature enclosure.

5. The stirring hot plate of claim 4 wherein the tubular conduit is rigidly connected to the low temperature enclosure.

6. The stirring hot plate of claim 1 wherein a temperature sensor is mounted in the high temperature enclosure.

7. The stirring hot plate of claim 6 wherein the temperature sensor is a thermocouple attached to the lower surface of the plate.

8. The stirring hot plate of claim 1 wherein the electrical heating element is embedded within the plate.

9. The stirring hot plate of claim 1 wherein an over-temperature switch connected in series with the heating element is mounted in the high temperature enclosure.

10. The stirring hot plate of claim 1 wherein the stirring device produces a rotating magnetic field above the upper surface of the plate.

11. The stirring hot plate of claim 10 wherein the low temperature enclosure has an upper wall and the stirring device comprises a drive motor having a rotating output shaft extending vertically upward through the upper wall of the low temperature enclosure.

12. The stirring hot plate of claim 11 wherein the stirring device further includes a driving magnet connected to an upper end of the rotating output shaft external to the low temperature chamber and below the upper surface of the plate; the driving magnet rotating with the output shaft and producing the rotating magnetic field above the upper surface of the plate.

13. The stirring hot plate of claim 12 wherein a fan is mounted on the output shaft for circulating air around external surfaces of the low temperature enclosure.

14. The stirring hot plate of claim 13 wherein a housing surrounds the low and high temperature enclosures and forms an air duct between the housing and the low temperature chamber, whereby the fan circulates air between the housing and the low temperature enclosure.

15. The stirring hot plate of claim 12 wherein the upper wall of the low temperature housing has a bore shaped to receive the output shaft, the bore having a length of at least one inch.

16. The stirring hot plate of claim 15 wherein a diametric clearance between the output shaft and the bore is less than 0.030 inches.

17. The stirring hot plate of claim 3 wherein the tubular conduit has an upper end threadedly connected into and through a bottom wall of the high temperature enclosure.

18. The stirring hot plate of claim 17 wherein the low temperature enclosure has a second wall and the tubular conduit has a lower end secured to and extending through the second wall of the low temperature enclosure.

19. The stirring hot plate of claim 18 wherein the second wall has a bore shaped to receive a shaft on the lower end of the tubular conduit.

20. The stirring hot plate of claim 19 wherein the bore in the second wall and the shaft have a length of at least one inch.

21. The stirring hot plate of claim 20 wherein the bore in the second wall and the shaft have a diametric clearance of less than 0.030 inches.

22. The stirring hot plate of claim 19 wherein the lower end of the tubular conduit terminates with threads, and the conduit is secured within the bore in the second wall by a nut in the low temperature enclosure screwed onto the threads on the lower end of the conduit.

23. The stirring hot plate of claim 1 further comprising a first heat shield disposed between the lower surface of the plate and the upper wall of the low temperature enclosure.

24. The stirring hot plate of claim 23 further comprising a second heat shield disposed between the first heat shield and the upper wall of the low temperature enclosure.

25. The stirring hot plate of claim 24 wherein the first and second heat shields are made of stainless steel.

26. The stirring hot plate of claim 24 wherein the fan on the output shaft of the motor is disposed between the first and second heat shields.

27. The stirring hot plate of claim 24 wherein the first and second heat shields are separated from each other, the lower surface of the plate and the upper wall of the low temperature enclosure by spacers having a low thermal conductivity.

28. The stirring hot plate of claim 27 wherein the spacers are made of a ceramic material.

29. The stirring hot plate of claim 1 wherein the low temperature enclosure is comprised of two opposed parts having mating peripheral flanges for connecting the parts together.

30. The stirring hot plate of claim 29 wherein the high temperature enclosure has a peripheral mounting flange for connecting the high temperature enclosure to the lower surface of the plate.

31. The stirring hot plate of claim 30 wherein the flanges have an uninterrupted width of at least 0.375 inches.

32. The stirring hot plate of claim 1 wherein the low temperature enclosure has a side wall with a first bore therein shaped to receive a first control knob shaft for controlling the speed of the motor.

33. The stirring hot plate of claim 32 wherein the side wall of the low temperature enclosure has a second bore therein shaped to receive a second control knob shaft for controlling the temperature of the plate.

34. The stirring hot plate of claim 33 wherein the first and second bores and first and second control knob shafts have respective lengths of at least one inch.

35. The stirring hot plate of claim 34 wherein the first and second bores and first and second control knob shafts have respective diametric clearances of less than 0.030 inches.

36. The stirring hot plate of claim 1 wherein the plate and high temperature enclosure have temperatures of up to 220° C. and the low temperature enclosure has temperatures of less than 125° C.

37. A hot plate and stirrer comprising:

a plate having a generally horizontal upper surface for supporting a vessel containing a substance to be heated and stirred;

an electrical heating element in a heat transfer relation to the vessel supported on the plate, the heating element electrically connected to heat the substance in the vessel supported on the plate;

a high temperature enclosure disposed on a lower surface of the plate for receiving an end of the electrical heating element, the high temperature enclosure having a temperature approximately equal to the temperature of the plate when the heating element is electrically energized;

a low temperature enclosure having a desired temperature lower than the plate;

a temperature control mounted in the low temperature enclosure; and a tubular conduit having
one end connected to the low temperature enclosure, and
an opposite end connected to the high temperature enclosure, the tubular conduit being made of a material having a low thermal conductivity such that the one end of the conduit does not exceed the desired temperature in response to the opposite end of the conduit being approximately equal to the temperature of the plate.

38. A hot plate and stirrer comprising:

a plate having a generally horizontal upper surface for supporting a vessel containing a substance to be selectively heated and stirred;

an electrical heating element in a heat transfer relation to the vessel supported on the plate, the heating element electrically connected to heat the substance in the vessel supported on the plate;

a high temperature enclosure disposed on a lower surface of the plate for receiving an end of the electrical heating element, the high temperature enclosure having a temperature approximately equal to the temperature of the plate when the heating element is electrically energized;

a temperature control electrically connected to the heating element and the temperature sensor for selecting and controlling the temperature of the plate;

a stirring device producing a rotating magnetic field above the upper surface of the plate, the stirring device including a stirring device drive and speed control;

a low temperature enclosure surrounding the temperature control, the stirring device drive and the speed control, the low temperature enclosure having a desired temperature lower than the plate; and a tubular conduit having
one end connected to the low temperature enclosure,
an opposite end connected to the high temperature enclosure, and
an internal passage receiving and carrying wires between the high and the low temperature enclosures, the tubular conduit being made of a material having a low thermal conductivity such that the one end of the conduit does not exceed the desired temperature in response to the opposite end of the conduit being approximately equal to the temperature of the plate.

39. A hot plate comprising:

a plate having a lower surface and a generally horizontal upper surface for supporting a vessel containing a substance to be heated and stirred;

an electrical heating element in a heat transfer relation to the vessel supported on the plate, the heating element electrically connected to heat the substance in the vessel supported on the plate;

a high temperature enclosure for receiving an end of the electrical heating element, the high temperature enclosure being mounted to the lower surface of the plate to form a flame path between the high temperature enclosure and the lower surface of the plate, the flame path having a length so that flames from an explosion within the high temperature enclosure extinguish prior to exiting the flame path outside of the high temperature enclosure;

a control element having a desired operating temperature lower than the temperature of the plate; and a low temperature enclosure surrounding the control element and including an opening in a wall of the low temperature enclosure, a portion of the control element extending through the opening to form a flame path between the portion of the control element and the wall of the low temperature enclosure, the flame path have a length so that flames from an explosion within the low temperature enclosure extinguish prior to exiting the flame path outside of the low temperature enclosure.

40. The hot plate of claim 39 further comprising a tubular conduit having
one end connected to the low temperature enclosure,
an opposite end connected to the high temperature enclosure, and
an internal passage extending between interiors of the high and low temperature enclosures.

41. The hot plate of claim 40 wherein the tubular conduit is made of a material having a low thermal conductivity such that the one end of the conduit does not exceed approximately the desired operating temperature in response to the opposite end of the conduit being approximately equal to the temperature of the plate.

42. The hot plate of claim 41 wherein the hot plate is a stirring hot plate further comprising a stirring device for stirring the substance in the vessel, the stirring device including a stirring device control mounted in the low temperature enclosure.

43. A stirring hot plate comprising:

a plate having a lower surface and a generally horizontal upper surface for supporting a vessel containing a substance to be heated and stirred;

an electrical heating element in a heat transfer relation to the vessel supported on the plate, the heating element electrically connected to heat the substance in the vessel supported on the plate;

a high temperature enclosure for receiving an end of the electrical heating element, the high temperature enclosure being mounted to the lower surface of the plate to form a flame path between the high temperature enclosure and the lower surface of the plate, the flame path having a length so that flames from an explosion within the high temperature enclosure extinguish prior to exiting the flame path outside of the high temperature enclosure;

a stirring device for stirring the substance in the vessel, the stirring device including a stirring device control having at least one rotatable shaft; and a low temperature enclosure surrounding the stirring device control and including an opening in a wall of the low temperature enclosure, the rotatable shaft extending through the opening to form a flame path between the portion of the rotatable shaft and the wall of the low temperature enclosure, the flame path having a length so that flames from an explosion within the low temperature enclosure extinguish prior to exiting the flame path outside of the low temperature enclosure.

* * * * *

UNITED STATES PATENT AND TRADEMARK OFFICE
CERTIFICATE OF CORRECTION

PATENT NO. : 5,834,739
DATED : Nov. 10, 1998
INVENTOR(S) : Lockwood et al.

It is certified that error appears in the above-identified patent and that said Letters Patent is hereby corrected as shown below:

In column 6, line 51, delete "path, 89", and insert therefor --path 89,--, In claim 12, column 9, line 39, delete "chamber", and insert therefor --enclosure--,

UNITED STATES PATENT AND TRADEMARK OFFICE
CERTIFICATE OF CORRECTION

PATENT NO. : 5,834,739
DATED : Nov. 10, 1998
INVENTOR(S) : Lockwood et al.

It is certified that error appears in the above-identified patent and that said Letters Patent is hereby corrected as shown below:

In claim 14, column 9, line 49, delete "chamber", and insert therefor --enclosure--, In claim 39, column 12, line 14, delete "have", and insert therefor --having--, Signed and Sealed this Twenty-ninth Day of June, 1999

Attest:

Q. TODD DICKINSON

Attesting Officer

Acting Commissioner of Patents and Trademarks